United States Patent [19]
Richardson

[11] Patent Number: 5,959,811
[45] Date of Patent: Sep. 28, 1999

[54] MAGNETORESISTIVE TRANSDUCER WITH FOUR-LEAD CONTACT

[75] Inventor: David Richardson, Santa Clara, Calif.

[73] Assignee: Read-Rite Corporation, Milpitas, Calif.

[21] Appl. No.: 09/006,307

[22] Filed: Jan. 13, 1998

[51] Int. Cl.[6] .................................................. G11B 5/39
[52] U.S. Cl. ............................................................ 360/113
[58] Field of Search ........................... 360/113; 324/252; 338/32 R

[56] References Cited

U.S. PATENT DOCUMENTS

| | | | |
|---|---|---|---|
| 5,027,243 | 6/1991 | Gill et al. | 360/113 |
| 5,739,987 | 4/1998 | Yuan et al. | 360/113 |
| 5,784,772 | 7/1998 | Ewasko et al. | 360/113 |
| 5,793,576 | 8/1998 | Gill | 360/113 |

*Primary Examiner*—David D. Davis
*Attorney, Agent, or Firm*—Nathan N. Kallman

[57] ABSTRACT

A magnetic head includes a magnetoresistive read transducer which comprises a central active region and two end regions. Bias current leads are connected respectively to end regions for current biasing of the transducer. Signal sensing leads is also are connected respectively to end regions for directing sensed voltage to a signal amplifier. The bias current and the sensed signal assume separate electrical paths. The current crowding effect in the bias current path does not affect the signal sensing path. Thus the transducer can sense signal with improved sensitivity and high signal-to-noise ratio. In one embodiment, at each end region, the bias current lead and the signal sensing lead are coplanar and are bifurcated to effectuate separate electrical paths. In another embodiment, the signal sensing lead and the bias current lead are electrically connected together via an electrical feedthrough at each end region, but are dielectrically separated by an insulating layer at other regions.

15 Claims, 6 Drawing Sheets

MAGNETORESISTIVE TRANSDUCER WITH FOUR-LEAD CONTACT

FIELD OF THE INVENTION

This invention relates to read heads for magnetic recording systems and in particular to magnetoresistive (MR) transducers having electrical biasing and signal detection means.

DESCRIPTION OF THE PRIOR ART

Prior art magnetic head assemblies include inductive elements for recording data onto a magnetic disk, and MR elements for reading the recorded data from the disk. The operation of the MR element is based on the principle that the resistance of certain materials changes when subjected to a magnetic field. Output signals from the MR element are generated by supplying it with a constant direct electrical current. The flux from the magnetic disk that is sensed by the MR element results in a change in voltage across the MR element that is proportional to the change in resistance of the MR material caused by the flux.

As physical sizes of thin film magnetic heads decrease, providing electrical contacts to the MR transducers for current biasing and signal detection become technically more difficult. Very often, the electrical leads connected to these transducers substantially degrade the transducer sensitivity. Furthermore, the sensed signals are adversely affected by several noise sources that degrade the signal-to-noise ratio (SNR) of the read head, and thereby limit its usefulness. One type of such noise mechanism is caused by noise current in internal lead resistance and another type is caused by random charge fluctuations in the leads, called Johnson or Nyquist noise.

FIG. 1 shows a top plan view of a prior art thin film magnetic read head assembly 4 and FIG. 2 is a cross-sectional side view taken along line 2—2 of FIG. 1. The magnetic read head assembly 4 includes a read transducer 6, which in this case is a CPP (Current-Perpendicular-to-the-Plane) transducer. The "plane" is defined as a plane parallel to the major surface of the MR element formed in the magnetic read head assembly. Electrical leads 8 and 10 are connected to the end regions 6A and 6B of the transducer 6, respectively. The electrical leads 8 and 10 are disposed between, but dielectrically separated from, magnetic shields 14 and 16. The top layers, such as the magnetic shield 14 and the associated insulating layers are not shown in FIG. 1 for the purpose of clarity. The entire magnetic head assembly 4 is typically seated on a ceramic substrate (not shown) and includes an air bearing slider (not shown) on which the transducer is disposed, as is well known in the art.

During the data reading mode, a bias current I is passed through the transducer 6 via the electrical leads 8 and 10. Magnetic flux emanating from the medium 12, typically a magnetic disk on which information is recorded, is sensed by the magnetic head assembly 4. The MR transducer 6 varies in resistivity in response to changes in the magnetic flux. Since the transducer 6 is biased by the direct current I, a varying voltage is accordingly generated. The varying voltage corresponds to the electrical signals produced by the transducer 6 as the information read out from the medium 12. The detected signals are passed by the electrical leads 8 and 10 through the respective end regions 6A and 6B of the transducer 6 to an amplifier (not shown).

FIG. 3 shows an equivalent circuit of the transducer 6 with the electrical leads 8 and 10. The resistances of the leads 8 and 10 are designated by the respective symbols $R_{L1}$ and $R_{L2}$. The major ingredient for the resistive values $R_{L1}$ and $R_{L2}$ will be explained later in this specification. The transducer 6 itself has an intrinsic resistance designated by $R_T$. In the quiescent state, that is, when the transducer 6 senses no magnetic flux changes, under the bias current I, the DC voltage sensed by the amplifier (not shown) at the terminals 18 and 20 is represented by the following equation:

$$V = I(R_{L1} + R_T + R_{L2}) \quad (1)$$

where V is the quiescent voltage sensed in volts. When a change in magnetic flux is detected by the transducer 6, a change in transducer resistance in an amount of $\delta R_T$ is affixed to the intrinsic transducer resistance $R_T$. $\delta R_T$ can be positive or negative in value, depending on the direction of magnetic flux change. In response, a sensed voltage is accordingly recorded and is represented by the following equation:

$$V + \delta V = I(R_{L1} + R_T + \delta R_T + R_{L2}) \quad (2)$$

where $V + \delta V$ is the corresponding voltage sensed in volts due to the magnetic flux change. Depending on the operating conditions and device design, it is possible that the sensed voltage change $\delta V$ can be very small. The main reason is because the resistive values $R_T$ and $\delta R_T$ are very small in the signal sensing path. In reality, the resistance value $R_{L1}$ or $R_{L2}$ for the respective electrical leads 8 and 10 can assume a value of a few Ohms. However, the intrinsic resistance value $R_T$ of the transducer 6 is normally several orders of magnitude lower, very often in the milli-Ohm range. As a consequence, from equations (1) and (2), with the bias current I kept constant, a small change in transducer resistance $\delta R$ generates a small voltage $\delta V$, in comparison with quiescent voltage V and the Johnson noise voltage values associated with $R_{L1}$ and $R_{L2}$, due to the disparity in resistance value between $R_T$, and the total resistance value of $R_{L1}$ and $R_{L2}$.

The resistance values $R_{L1}$ and $R_{L2}$ come mainly from the current crowding effect in the leads 8 and 10. In addition, the leads 8 and 10 with their high resistances $R_{L1}$ and $R_{L2}$ are subject to background noise which is detrimental to the signal-to-noise ratio (SNR) of the transducer 6.

In order to achieve higher recording densities, the recording bit size must be reduced. Data tracks associated with the magnetic disks are consequently made narrower in width and thus provide weaker magnetic flux readout signals. Therefore, highly sensitive magnetic heads are required to read accurately the data recorded on the magnetic disks.

SUMMARY OF THE INVENTION

An object of the invention is to provide a magnetic head with a read transducer that is highly sensitive.

Another object of the invention is to provide a read transducer in a magnetic head capable of providing an output signal with high signal-to-noise ratio.

A further objective of the invention is to provide a read transducer in a magnetic head of simple design affording ease of production, thereby minimizing manufacturing costs.

According to the present invention, a magnetic head is formed with a read transducer that includes a central active region with two end regions. Two bias current leads are connected to respective end regions for directing bias current to the transducer and two signal sensing leads are connected to the respective end regions for simultaneously directing sensed voltage to a signal amplifier. In one embodiment, at each end region, the bias current lead and the signal sensing lead are coplanar and are bifurcated to effectuate two separate electrical paths. In another embodiment, the current sensing lead and the bias current lead are electrically connected together via an electrical feedthrough at each end region. The bias current path and the signal sensing path are no longer commonly shared. The current crowding effect in the bias current path therefore cannot give rise to high lead resistance in the sense circuit. Consequently, the transducer is capable of operating at high sensitivity and realizing a high SNR ratio.

BRIEF DESCRIPTION OF THE DRAWINGS

Like reference numerals refer to like elements.

DETAILED DESCRIPTION OF THE INVENTION

Figure 1:
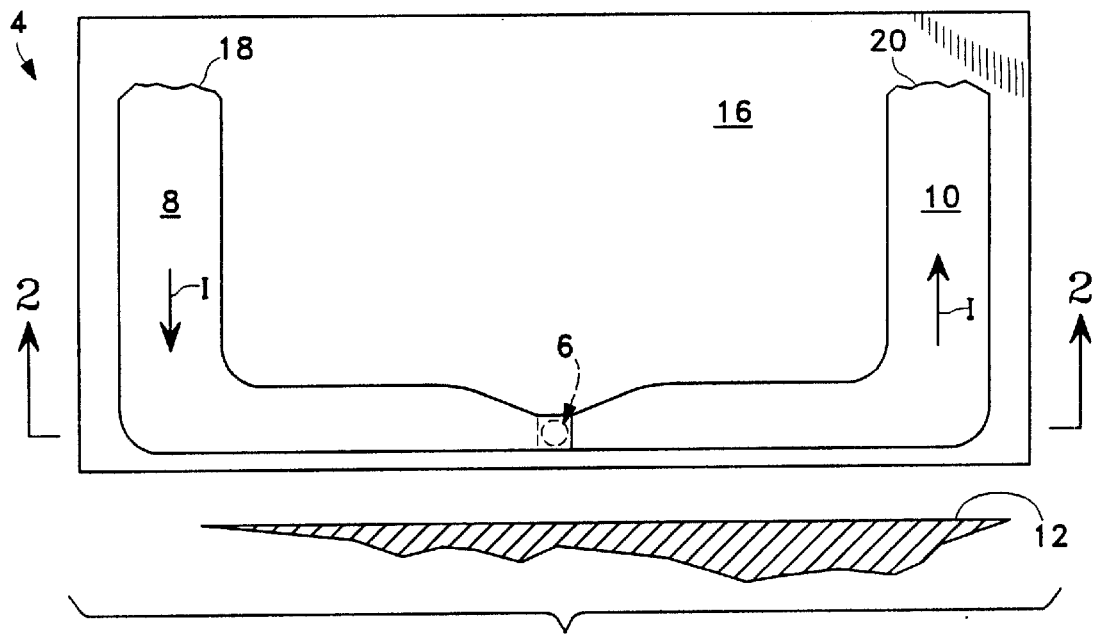
FIG. 1 is a top plan view of a prior art thin film magnetic read having a CPP read transducer connected to two electrical leads for both current biasing and voltage sensing.
Figure 2:
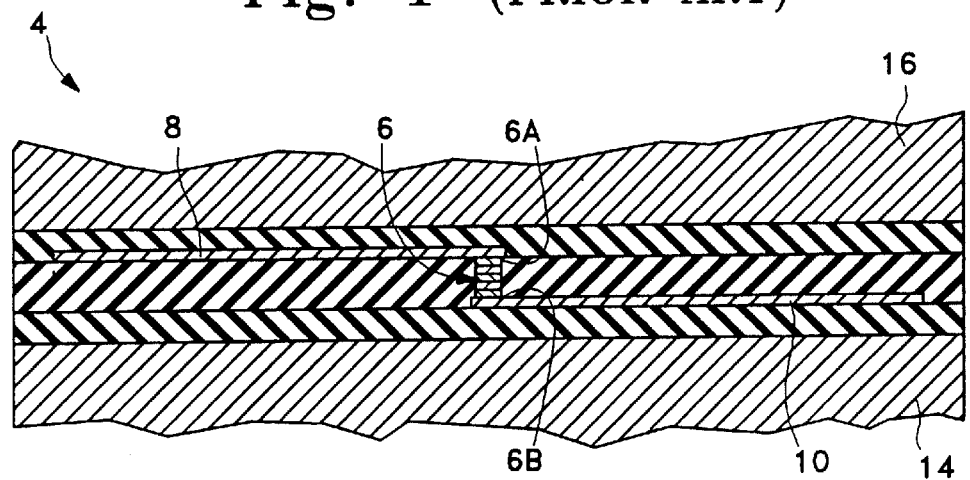
FIG. 2 is a cross-sectional front view taken along the line 2—2 of FIG. 1.
Figure 3:
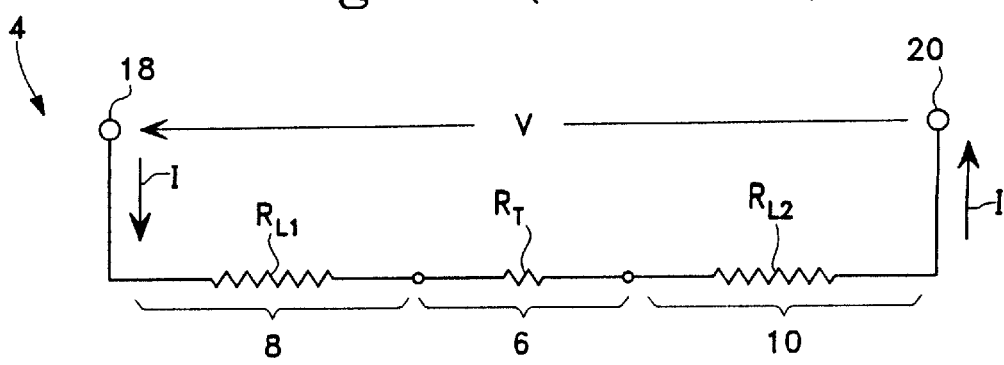
FIG. 3 is a schematic representation of the equivalent circuit of the magnetic head shown in FIGS. 1 and 2.
Figure 4:
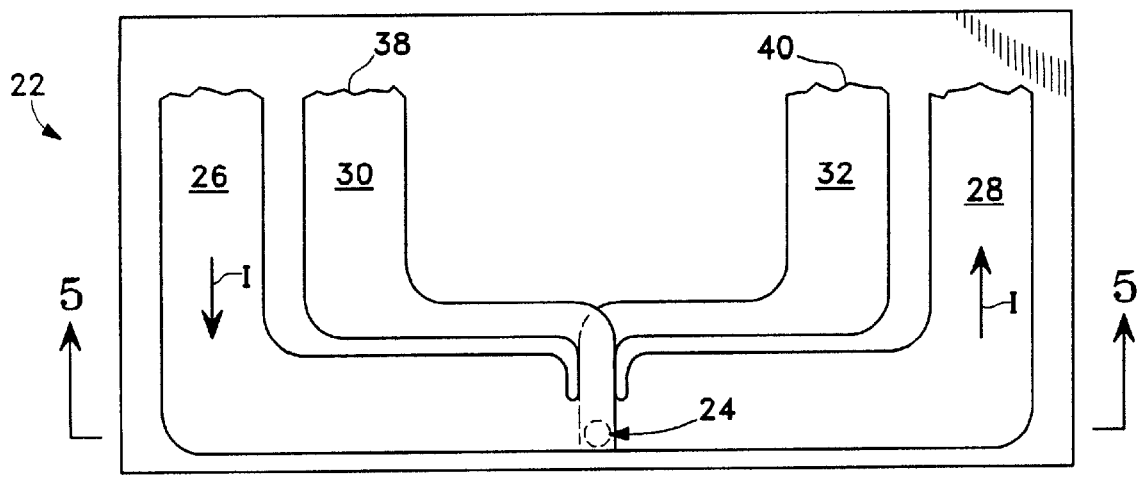
FIG. 4 is a top plan view of one embodiment of the thin film magnetic head of the invention, having a CPP read transducer connected to two electrical leads for current biasing, and another two electrical leads for voltage sensing.
Figure 5:
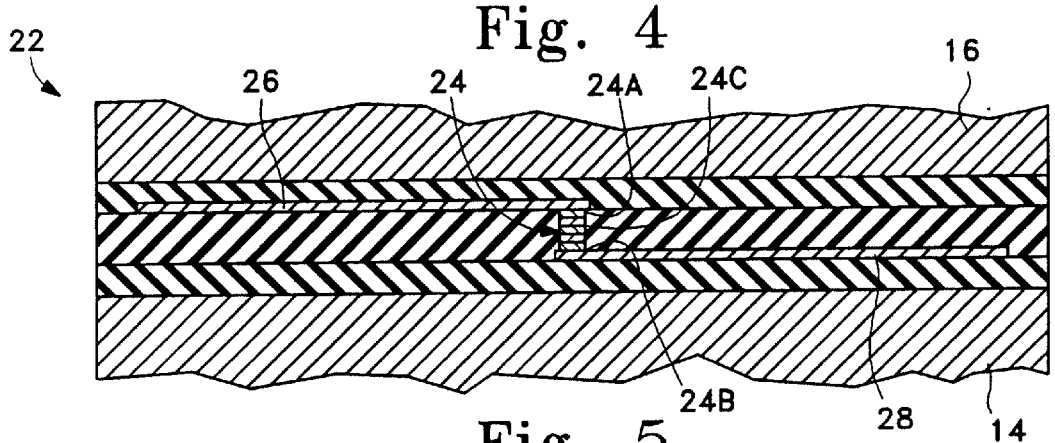
FIG. 5 is cross-sectional front view taken along the line 5—5 of FIG. 4.
Figures 6, 7:
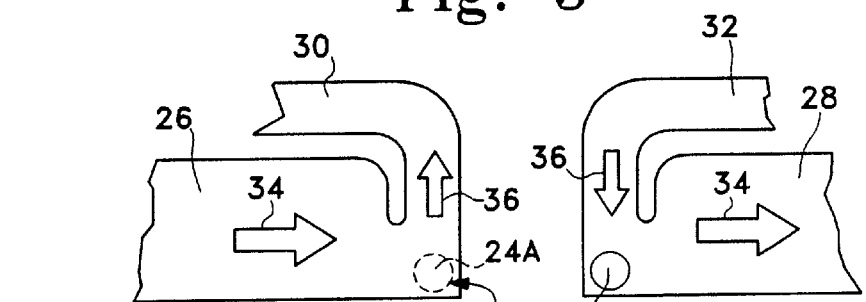
FIG. 6 is an enlarged view of one end region of the read transducer illustrating the bifurcated electrical paths.
FIG. 7 is an enlarged view of another end region of the read transducer illustrating the bifurcated electrical paths.
Figure 8:
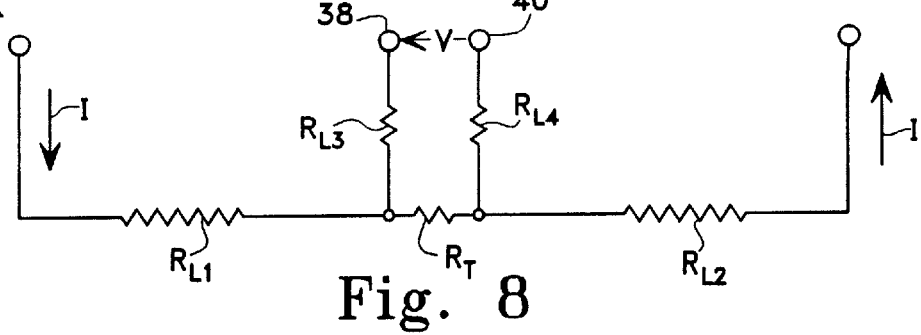
FIG. 8 is a schematic representation of the equivalent circuit of the magnetic head shown in FIGS. 4–7.

With reference to FIGS. 4 and 5, a magnetic read head 22 is illustrated with the overlying layers removed, thereby exposing the relevant layers for illustration. The magnetic read head 22 includes a CPP read transducer 24 having four electrical leads 26, 28, 30 and 32. Specifically, electrical leads 26 and 28 are bias current leads for steering a bias current I from a current source (not shown) to the transducer 24. Electrical leads 30 and 32 are signal sensing leads for simultaneously directing sensed signals to an output circuit comprising a signal amplifier (not shown). In this embodiment, the electrical leads 26 and 30 are coplanar and are connected to the first end region 24A of the transducer 24. FIG. 6 shows the leads 26 and 30 connected to the first end 24A of the transducer 24. The electrical lead connected to the first end section 24A of the transducer 24 is bifurcated into two paths, namely, the current carrying path 34 on the lead 26 and the voltage sensing path 36 on the lead 30. The bifurcated lead provides the benefit of substantially isolating the voltage sensing path 36 from the current crowding effect in the current carrying path 34, thereby bypassing the unwanted nonlinear resistance behavior inherent with the current path 34. In a similar manner, the electrical leads 28 and 32 are also coplanar and are connected to the second end region 24B of the transducer 24. FIG. 7 shows the leads 28 and 32 connected to the second end 24B of the transducer 24. The electrical lead at the second end section 24B is split into two paths 34 and 36. The sensed voltage V at the terminals 38 and 40 of the respective electrical leads 30 and 32 can be expressed by the following equation:

$$V = IR_T$$

where V is the quiescent voltage sensed in Volts and I is the bias current in amperes. No bias voltage is developed across $R_{L3}$ and $R_{L4}$ large lead resistance due to bulk resistivity and current crowding effects. The values for the resistance $R_{L3}$ and $R_{L4}$ assume low values in the range of 0.01–2.0 ohms.

When a change in magnetic field is detected by the active region 24C (FIG. 5) of the transducer 24, a change in transducer resistance in an amount of $\delta R_T$, which can assume either a positive or a negative value, is added to the intrinsic transducer resistance $R_T$. The sensed voltage is accordingly changed and is represented by the following equation:

$$V + \delta V = I(R_T + \delta R_T)$$

where $V+\delta V$ is the corresponding voltage sensed in volts due to magnetic field change. As a consequence, the transducer 24 can operate with a high SNR.

Figure 9:
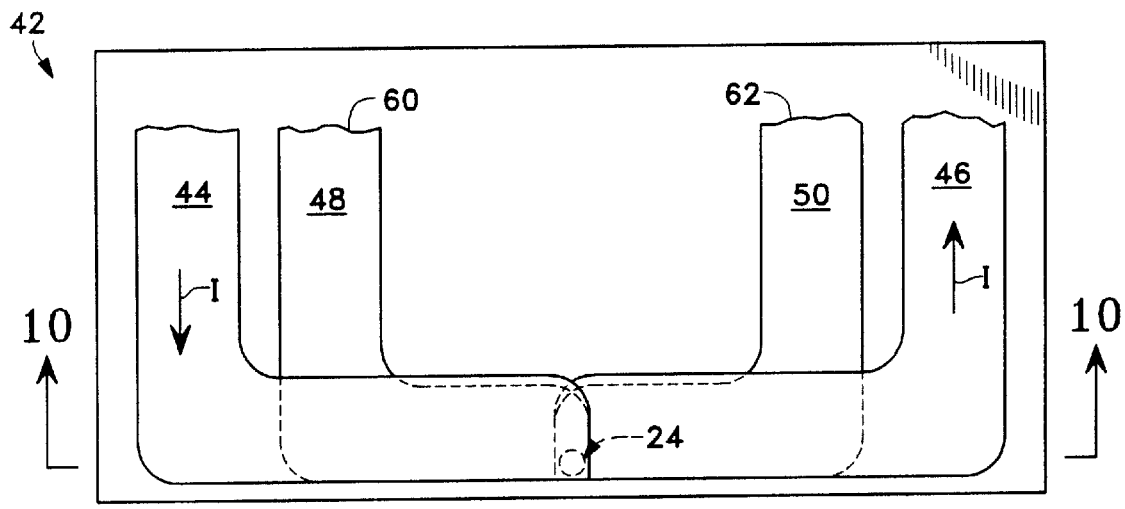
FIG. 9 is a top plan view of a second embodiment of the thin film magnetic head of the invention, having a CPP read transducer connected to two electrical leads for current biasing, and another two electrical leads for voltage sensing.
Figure 10:
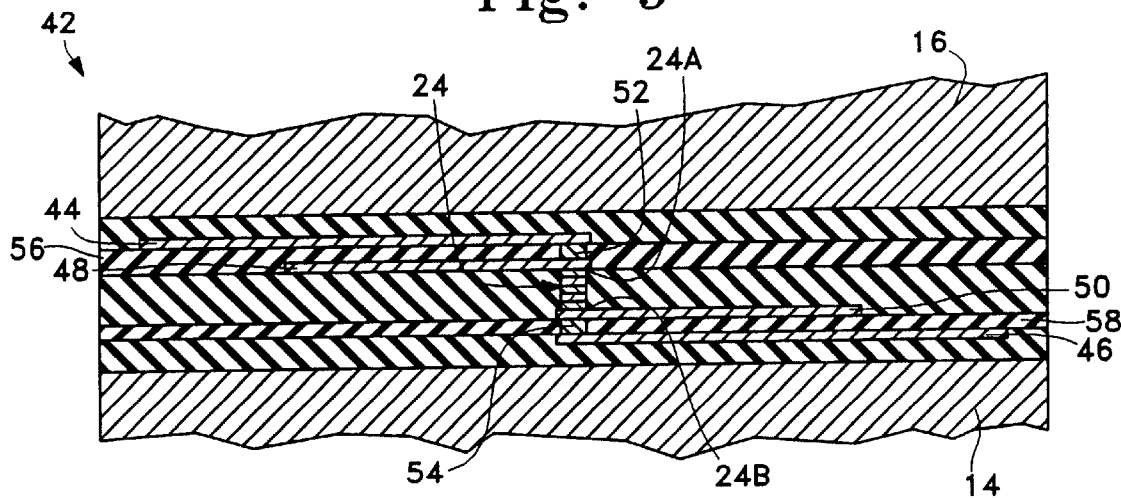
FIG. 10 is cross-sectional front view taken along the line 10—10 of FIG. 9.

FIG. 9 shows a top plan view of magnetic read head 42 with the overlying layers removed to expose the relevant layers for purpose of illustration. FIG. 10 is a cross-sectional side view taken along the line 10—10 of FIG. 9. The magnetic read head 42 includes a CPP read transducer 24 having four electrical leads 44, 46, 48 and 50. Electrical leads 44 and 46 are bias current leads for steering a bias current I from a current source (not shown) to the transducer 24. Electrical leads 48 and 50 are signal sensing leads for simultaneously directing sensed signal to an output circuit, such as a signal amplifier (not shown). However, in this embodiment, the electrical leads 44 and 48 are electrically connected together by a conductive feedthrough 52 at the first contact region 24A of the transducer 24. The leads 44 and 48 are dielectrically isolated from each other at regions other than the first contact region 24A by an insulating layer 56. With this arrangement, the lead resistance $R_{L5}$ of the lead 48 can further be reduced. The feedthrough 52 has a low resistance and therefore $R_{L5}$ can be very small, in the range of 0.01–2.0 ohms for example. In a similar fashion, the electrical leads 46 and 50 are electrically connected together by another conductive feedthrough 54 adjacent to the second contact region 24B of the transducer 24. The leads 46 and 50 are also dielectrically isolated from each other at regions other than the second contact region 24B by another insulating layer 58. For the same reasons as stated above, the lead resistance $R_{L6}$ of the lead 48 is comparably low. The equation for the sensed voltage V at the terminals 60 and 62 of the electrical leads 48 and 50 can be expressed by the following equation:

$$V = IR_T$$

where V is the quiescent voltage sensed in volts and I is the bias current in Amperes.

When a change in magnetic field is detected by the active region of the transducer 24, the corresponding sensed voltage is represented by the following equation:

$$V + \delta V = IR_T + \delta R_T$$

where $V + \delta V$ is the corresponding voltage sensed in volts due to due magnetic field change. The consequential benefit is that the transducer 24 can operate with even higher SNR.

Figure 11:
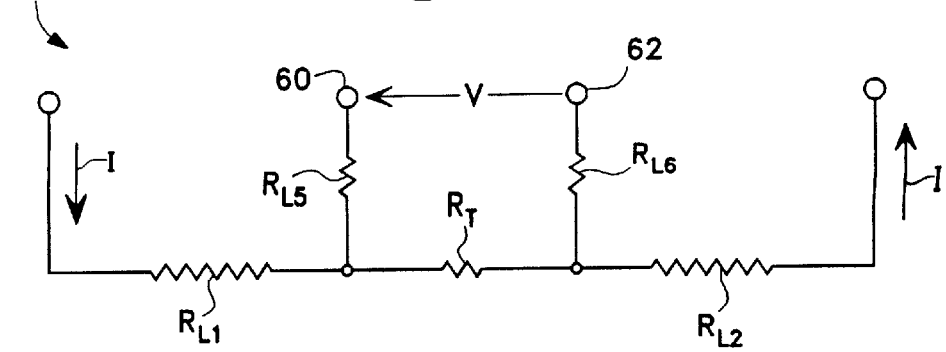
FIG. 11 is a schematic representation of the equivalent circuit of the magnetic head shown in FIGS. 9–10.

In should be noted that in the embodiments described, the electrical leads can serve the dual functions of current conducting and magnetic flux shielding. For example, in the first embodiment shown in FIGS. 4–8, the magnetic shields 14 and 16 can be eliminated. The electrical leads 26 and 28 can provide magnetic flux shielding for directing magnetic field lines to the transducer 24. Likewise, in the second embodiment shown in FIGS. 9–11, the electrical leads 44 and 46 can act as magnetic shields replacing the shields 14 and 16 shown in FIG. 10.

Figure 12:
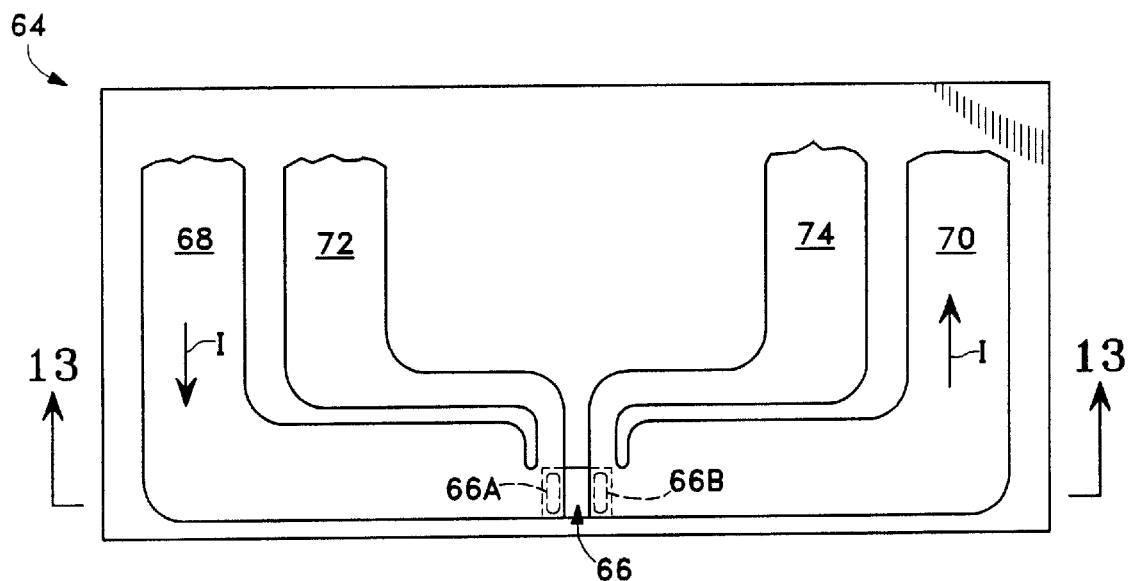
FIG. 12 is a top plan view of a third embodiment of the thin film magnetic head of the invention having, a CIP (Current-in-the Plane) read transducer connected to two electrical leads for current biasing, and another two electrical leads for voltage sensing.
Figure 13:
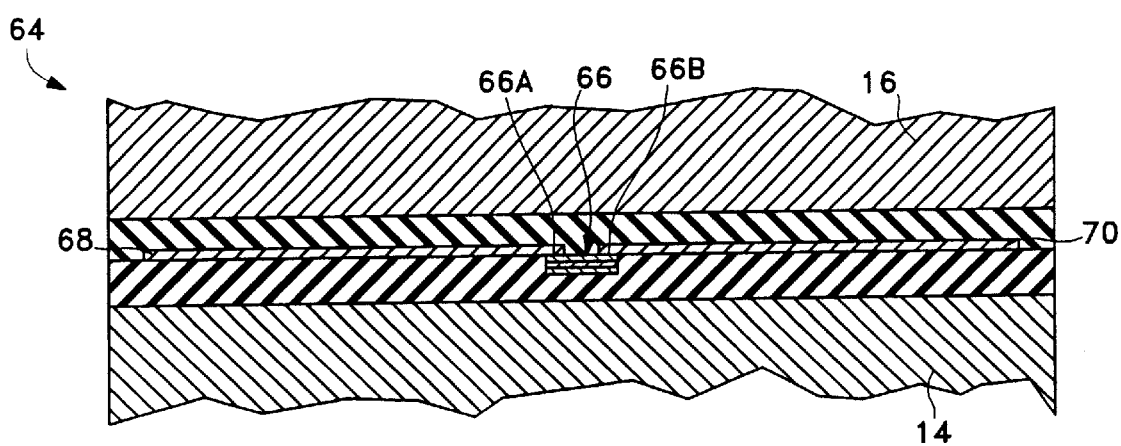
FIG. 13 is cross-sectional front view taken along the line 13—13 of FIG. 12.

It also should be appreciated that the use of a four-lead contact on a read transducer, in accordance with the invention, does not restrict itself only to a CPP transducer. With reference to FIGS. 12 and 13, a transducer 64 includes a current-in-plane (CIP) read transducer 66 and four electrical leads 68, 70, 72 and 74. Electrical leads 68 and 70 are bias current leads for providing a bias current I from a current source (not shown) to the transducer 66. Electrical leads 72 and 74 are signal sensing leads for directing sensed signals to an output circuit comprising a signal amplifier (not shown). In this embodiment, the electrical leads 68 and 72 are coplanar and are in contact with the first contact region 66A of the transducer 66. In a similar fashion, the electrical leads 70 and 74 are coplanar and are in contact with the second contact region 66B of the transducer 66.

Figure 14:
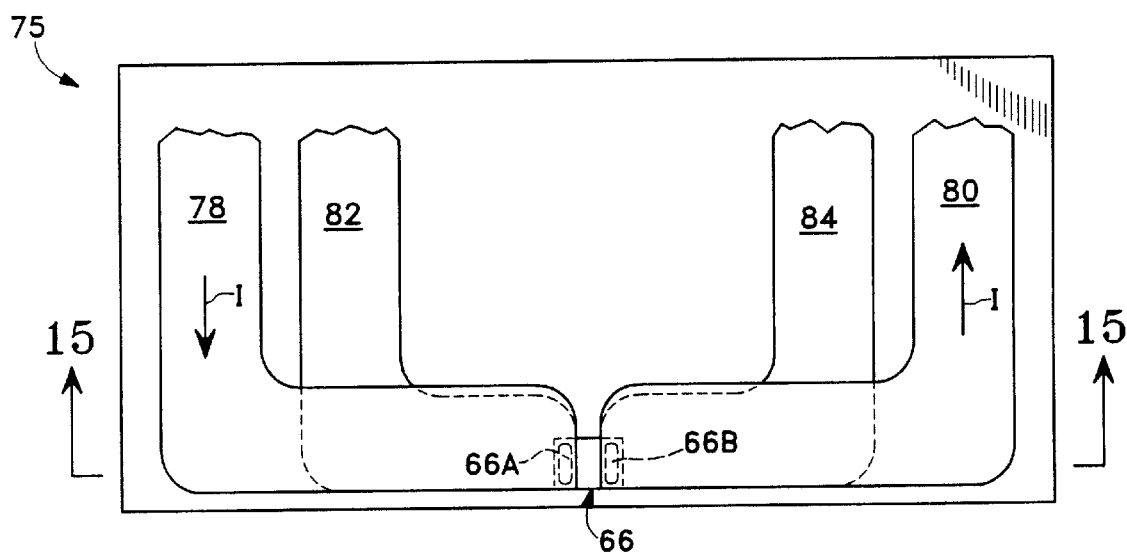
FIG. 14 is a top plan view of a fourth embodiment of the thin film magnetic head of the invention having a CIP read transducer connected to two electrical leads for current biasing, and another two electrical leads for voltage sensing.
Figure 15:
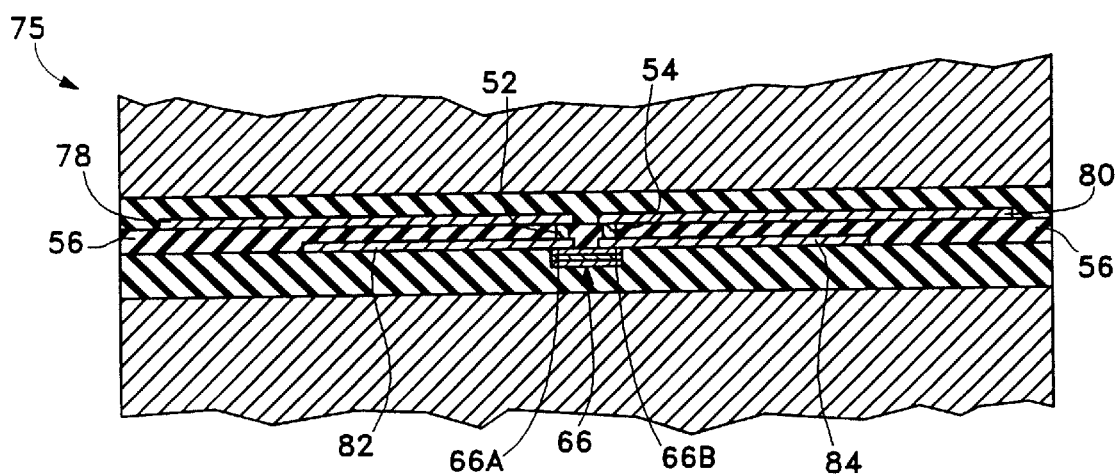
FIG. 15 is cross-sectional front view taken along the line 15—15 of FIG. 14.

FIGS. 14 and 15 illustrate a CIP read transducer 75 and four electrical leads 78, 80, 82 and 84. Electrical leads 78 and 80 are bias current leads for providing a bias current I from a current source (not shown) to the transducer 66. Electrical leads 82 and 84 are signal sensing leads for simultaneously directing sensed signal to a signal amplifier (not shown). In this embodiment, the electrical leads 78 and 82 are electrically connected by a conductive feedthrough 52 adjacent to the first contact region 66A of the transducer 75. The leads 78 and 82 are dielectrically isolated from each other at the regions other than the first contact region 66A by an insulating layer 56. Similarly, the electrical leads 80 and 84 are electrically connected by a conductive feedthrough 54 adjacent to the second contact region 66B of the transducer 66. The leads 80 and 84 are dielectrically isolated from each other at the regions other than the second contact region 66B by the insulating layer 56. The operational details and principles of the third and fourth embodiments are substantially similar to those of the first and second embodiments.

Figure 16:
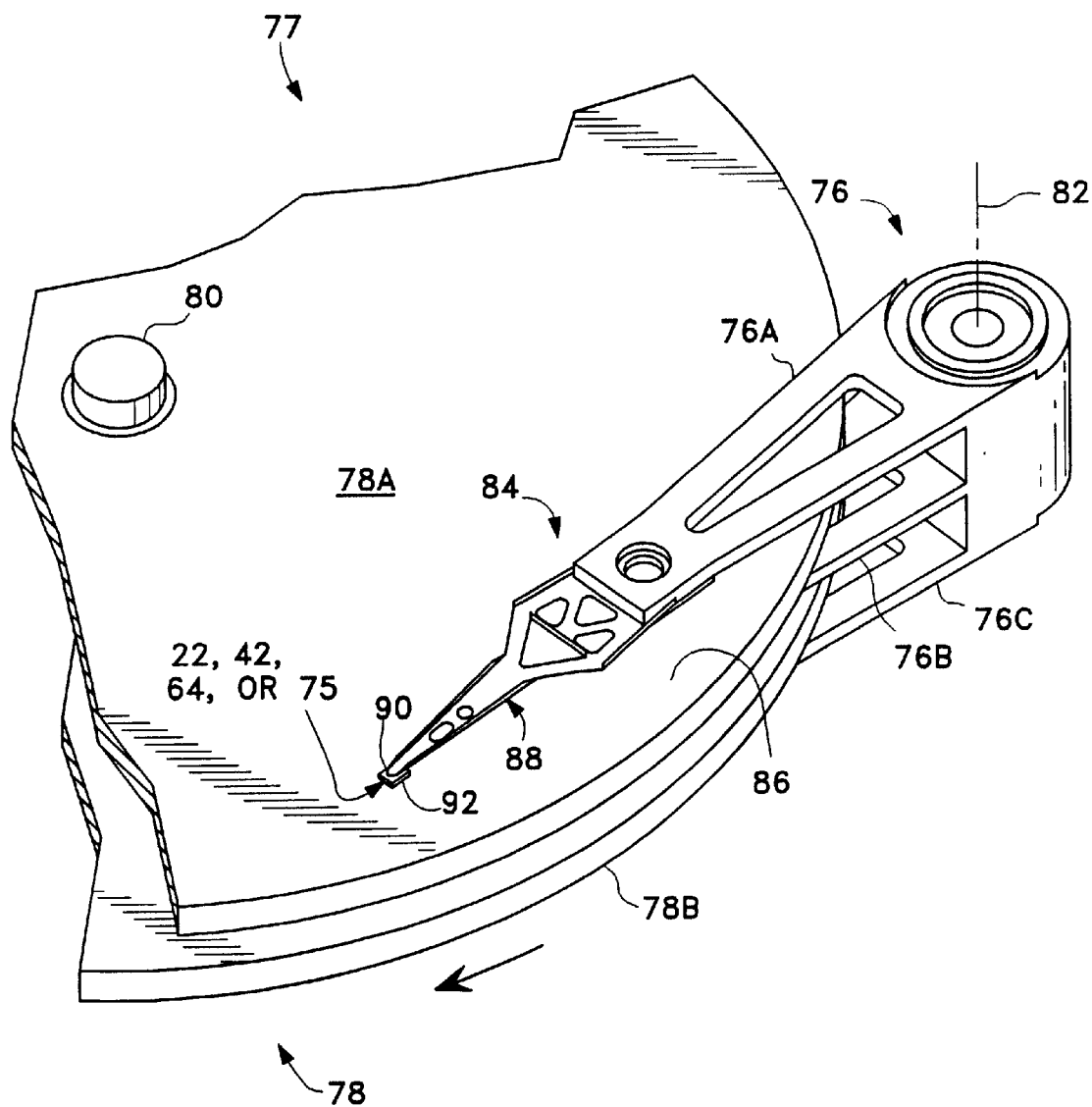
FIG. 16 is an fragmentary view of a disk drive showing an exemplary use of the magnetic head of the invention.

FIG. 16 is a fragmentary view of a disk drive 77 having a rotary actuator arm assembly 76 and a stack of spaced apart disks 78 rotatable about a common spindle 80. The actuator arm assembly 76 is also rotatable about an actuator arm axis 82. The arm assembly 76 includes a plurality of actuator arms 76A–76C which extends into the spacings between the disks 78A and 78B. Attached to each of the actuator arms 76A–76C is a magnetic head suspension arrangement 84, which comprises a resilient load beam 88, a flexure 90 and a slider 92. The magnetic head of the invention, such the head 22, 42, 64 or 75, is disposed at the end of the slider 92.

During normal operations, the disks 78A–78B spin at high speed about the common spindle 80. The actuator arm assembly 76 moves the arms 76A–76C to access selected data tracks of the disks. The aerodynamics of the moving air between the slider 92 and an associated disk surface 86 of the disk 78A and the opposing spring force of the load beam 88 directed towards the disk surface causes the slider 92 to fly close to the disk surface. The magnetic head, such as the head 22, 42, 64 or 75, detects the magnetic flux representative of the recorded signal, and the detected signal is directed to an output circuit for amplification and further processing.

It should be understood that modifications and variations to the disclosed embodiments may be made within the scope of the invention. For example, the magnetic head of the invention may be used with other types of storage media, such as drums or tapes, as well as with hard disk drives. Furthermore, the inventive read transducer above can be implemented in conjunction with a write transducer as a merged head. These and other changes in form and detail may be made therein without departing from the scope and spirit of the invention.

What is claimed is:

1. A thin film magnetic head comprising:
    a magnetoresistive read transducer having first and second contact regions spaced by an active region;
    first and second electrical leads connected respectively to said first and second contact regions for directing bias current to said transducer; and
    third and fourth electrical leads connected respectively to said first and second contact regions for simultaneously detecting magnetic flux representative of recorded signals and directing the detected signal to an output circuit, wherein said first and third electrical leads are electrically connected by a first conductive feedthrough at said first contact region, said first and third electrical leads being dielectrically separated from each other by a first insulating layer at regions other than said first contact region.

2. The thin film magnetic head as set forth in claim 1 wherein said first and second electrical leads are respectively disposed coplanar with said third and fourth electrical leads.

3. The thin film magnetic head as set forth in claim 1 wherein said second and fourth electrical leads are electrically connected by a second conductive feedthrough at said second contact region, said second and fourth electrical leads being dielectrically separated from each other by a second insulating layer at regions other than said second contact region.

4. The thin film magnetic head as set forth in claim 1 wherein said second and fourth electrical leads are electrically connected by a conductive feedthrough at said second contact region, said second and fourth electrical leads being dielectrically separated from each other by an insulating layer at regions other than said second contact region.

5. The thin film magnetic head as set forth in claim 1 wherein said magnetoresistive read transducer is a current-in-the-plane magnetoresistive transducer.

6. The thin film magnetic head as set forth in claim 1 wherein said magnetoresistive read transducer is a current-perpendicular-to-the-plane magnetoresistive transducer.

7. The thin film magnetic head as set forth in claim 1 wherein one of said first and third electrical leads and one of said second and fourth electrical leads are respective first and second magnetic shields for said transducer.

8. A thin film magnetic head for reading magnetically recorded signals and for transducing changes in magnetic flux representative of information recorded on a magnetic medium to electrical signals comprising:

a read transducer including first and second contact regions spaced by an active region, said active region varying in electrical resistivity in response to changes in magnetic flux;

first and second electrical leads in contact with and connected respectively to said first and second contact regions; and third and fourth electrical leads in contact with and connected respectively to said first and second contact regions;

so that when an electrical current passes through said transducer via said first and second electrical leads, said active region of said transducer varies in resistivity in response to changes in magnetic flux sensed by said magnetic head, and a varying signal is produced at said transducer that passes through said third and fourth electrical leads as electrical signals representative of recorded data signals.

9. The thin film magnetic head as set forth in claim 8 wherein said first, second, third and fourth electrical leads are coplanar.

10. The thin film magnetic head as set forth in claim 8 wherein said first and third electrical leads are electrically connected by a conductive feedthrough at said first contact region, said first and third electrical leads being dielectrically separated by an insulating layer at regions other than said first contact region.

11. A thin film magnetic head for reading magnetically recorded signals and for transducing changes in magnetic flux representative of information recorded on a magnetic medium to electrical signals comprising:

a read transducer including first and second contact regions spaced by an active region, said active region varying in electrical resistivity in response to changes in magnetic flux;

first and second electrical leads in contact with and connected respectively to said first and second contact regions; and third and fourth electrical leads in contact with and connected respectively to said first and second contact regions;

so that when an electrical current passes through said transducer via said first and second electrical leads, said active region of said transducer varies in resistivity in response to changes in magnetic flux sensed by said magnetic head, and a varying signal is produced at said transducer that passes through said third and fourth electrical leads as electrical signals representative of recorded data signals; wherein said first, second, third and fourth electrical leads are coplanar;

wherein said first and third electrical leads are electrically connected by a conductive feedthrough at said first contact region, said first and third electrical leads being dielectrically separated by a first insulating layer at regions other than said first contact region;

wherein said second and fourth electrical leads are electrically connected by another conductive feedthrough at said second contact region, said second and fourth electrical leads being dielectrically separated by a second insulating layer at regions other than said second contact region.

12. The thin film magnetic head as set forth in claim 13 wherein said magnetoresistive read transducer is a current-in-the-plane magnetoresistive transducer.

13. The thin film magnetic head as set forth in claim 11 wherein said magnetoresistive read transducer is a current-perpendicular-to-the-plane magnetoresistive transducer.

14. The thin film magnetic head as set forth in claim 13 wherein one of said first and third electrical leads and one of said second and fourth electrical leads are respectively first and second magnetic shields for said transducer.

15. The thin film magnetic head as set forth in claim 11 wherein one of said first and third electrical leads and one of said second and fourth electrical leads are respectively first and second magnetic shields for said transducer.

* * * * *